United States Patent [19]

Okanoue et al.

[11] Patent Number: 5,452,292
[45] Date of Patent: Sep. 19, 1995

[54] COMPOSITE COMMUNICATION NETWORK

[76] Inventors: Yasuyo Okanoue; Shinya Nakamura, both of c/o NEC Corporation, 7-1, Shiba 5-chome, Minato-ku, Tokyo, Japan

[21] Appl. No.: 160,023

[22] Filed: Nov. 30, 1993

[30] Foreign Application Priority Data

Nov. 30, 1992 [JP] Japan .................................. 4-320820

[51] Int. Cl.⁶ ....................... H04L 12/46; H04L 12/66
[52] U.S. Cl. .................................. 370/54; 370/85.13; 370/94.3
[58] Field of Search ........................ 370/16, 54, 60, 61, 370/85.1, 85.4, 85.5, 85.12, 85.13, 85.14, 85.15, 94.1, 94.3, 13, 15, 16.1, 110.1; 340/825.05, 825.06, 825.07, 825.15, 825.16, 825.17, 825.5, 825.51, 825.52; 395/200, 325, 425, 725

[56] References Cited

U.S. PATENT DOCUMENTS

| | | | |
|---|---|---|---|
| 4,627,052 | 12/1986 | Hoare et al. | 370/85.13 |
| 4,706,081 | 11/1987 | Hart et al. | 370/61 |
| 5,027,350 | 6/1991 | Marshall | 370/85.13 |
| 5,136,580 | 8/1992 | Videlock et al. | 370/61 |
| 5,151,897 | 9/1992 | Suzuki | 370/85.13 |
| 5,247,620 | 9/1993 | Fukuzawa et al. | 395/325 |

FOREIGN PATENT DOCUMENTS

473066  3/1992  European Pat. Off. .
511144 10/1992  European Pat. Off. .

OTHER PUBLICATIONS

Proceedings of the Annual European Conference on Computer Systems and Software Engineering, "Models, Implementations and Design Options for Inter-Domain Policy Routing Protocols", vol. 6, May 1992, pp. 481–486.

*Primary Examiner*—Alpus Hsu
*Attorney, Agent, or Firm*—Ostrolenk, Faber, Gerb & Soffen

[57] ABSTRACT

A composite communication network of a hierarchical structure including a subnetwork at least in part thereof has a gateway (GW) node having a control message communication medium which includes three or more routes. Routing of the network layer level is performed between GW nodes and routing of the data link layer level is conducted in the ring subnetwork. Each node in the ring has an NE address to be distinguished in the ring and a routing table which shows a routing direction corresponding to a destination node. When the GW node in the ring including a target of a control message receives a message, the GW node sets an NE address of the target node in the packet of the message as a destination address, and processes the packet for transmitting to the control message communication medium indicated in the routing table. The node that receives the packet carries out mapping of the destination NE address of the packet and NE address of its own node by means of a routing application protocol of the data link layer level. When the two addresses coincide, the node transmits the packet to the internal message processor, but when they do not coincide, the node transmits the packet to a neighboring node and routing of the control message is performed with reference to the data link layer level in the ring subnetwork.

6 Claims, 12 Drawing Sheets

COMPOSITE COMMUNICATION NETWORK

BACKGROUND OF THE INVENTION

1. Field of the Invention

The present invention relates to a composite communication network of a hierarchical structure including a subnetwork, and more particularly, to a composite communication network in which a message set up in a packet and having a destination node indicated therein is transmitted within the communication network.

2. Description of the Related Art

In a conventional communication network, routing protocols of a network layer level such as RIP (routing message protocol) or IS—IS have been employed for routing control messages. In the case of these protocols, routing table messages have been changed periodically or for occasional requests for change, and hence a routing table for each node has been updated and routing of each node has been carried out based on the thus-renewed routing table.

The conventional routing protocol for control messages described above has a problem in that, for example, the RIP protocol is not applicable to a large-scale network because the transmission range of the routing message is limited to only 16 nodes, while with the IS—IS protocol, although its application is not restricted by a network size, the size of the routing message to be communicated between nodes or the size of a routing table to be held by each node is excessively expanded, resulting in an extended time used for routing, because routing of a whole network is controlled by each node. Further, these protocols are prepared without particular consideration to the physical characteristics of a ring type network, that is, a network of a ring type.

SUMMARY OF THE INVENTION

It is an object of the present invention to overcome the problems with the conventional routing methods and to provide a composite communication network including a connection means which makes it possible to apply the communication network to a large-scale network system and realize high-speed routing of the network.

In order to attain the above objects, the composite communication network of the present invention has a hierarchical structure including a subnetwork at least in part thereof, and within the communication network, a message set up in a packet and having a destination node indicated therein is transmitted, wherein, a node of the communication network having connection routes which extend in said communication network in three or more than three directions (hereinafter referred to as a gateway node or a GW node) comprises:

a first routing table for a node which belongs to a layer other than the layer to which the GW node belongs;

a first transmission control means which refers to the first routing table and the destination node indicated in said packet for transmitting said packet in accordance with an interlayer transmission protocol; and the GW node and anode other than the GW node of the communication network, comprise:

a second routing table related with a node in the layer to which the node belongs; and a second transmission control means which refers to the second routing table and the destination node indicated in the packet for transmitting said packet in accordance with an intralayer transmission protocol.

The subnetwork may comprise a composite communication network which has a ring type structure, a star type structure, a bus type structure, or a combination of these structures.

The first transmission control means and/or the second transmission control means may comprise:

means for determining whether the destination node indicated in the first packet is the same as its own node; and means for introducing a message of the packet and prohibiting transmission of the packet when the destination node is determined by the determining means to coincide with its own node.

The first transmission control means and second transmission control means may include:

means for determining whether the packet is for a health check;

means for introducing a message of the packet and executing a health check of its own node when the packet for the health check is found by the determining means; and means for sending a trouble signal to a plurality of nodes when abnormality is detected in the result of the health check.

the first transmission control means and the second transmission control means may comprise means for updating the first routing table and the second routing table according to a message for change when the message for change of routing is included in the message.

The message for the change may include the trouble message.

The novel features which are considered characteristic of the invention are set forth with particularity in the appended claims. The invention itself, however, and additional objects and advantages thereof will best be understood from the following description of embodiments thereof when read in connection with the accompanying drawings.

DETAILED DESCRIPTION OF THE PREFERRED EMBODIMENTS

Figure 1:
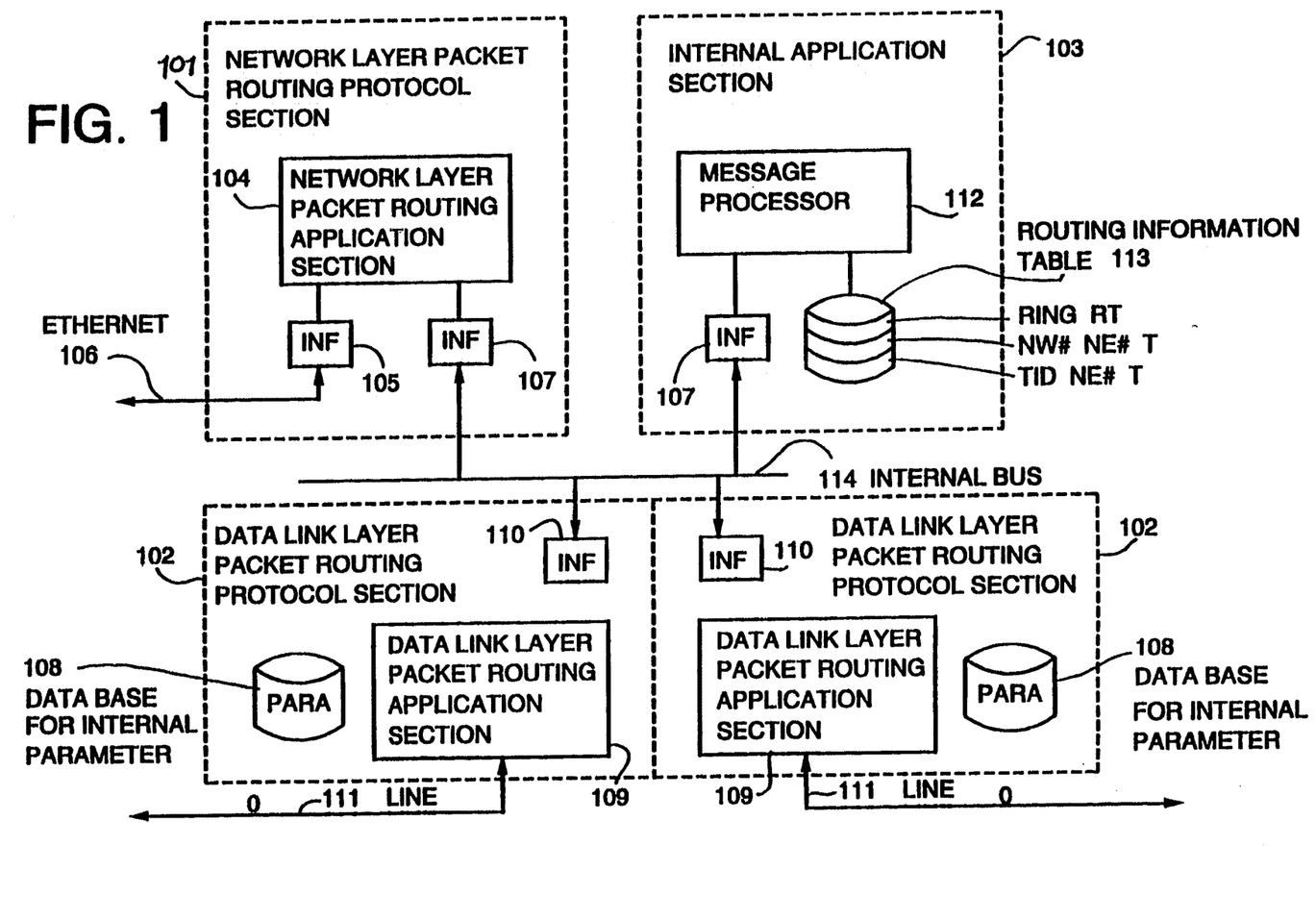
FIG. 1 is a block diagram showing the construction of a first and a second embodiment of the composite communication network of the present invention.
Figure 2:
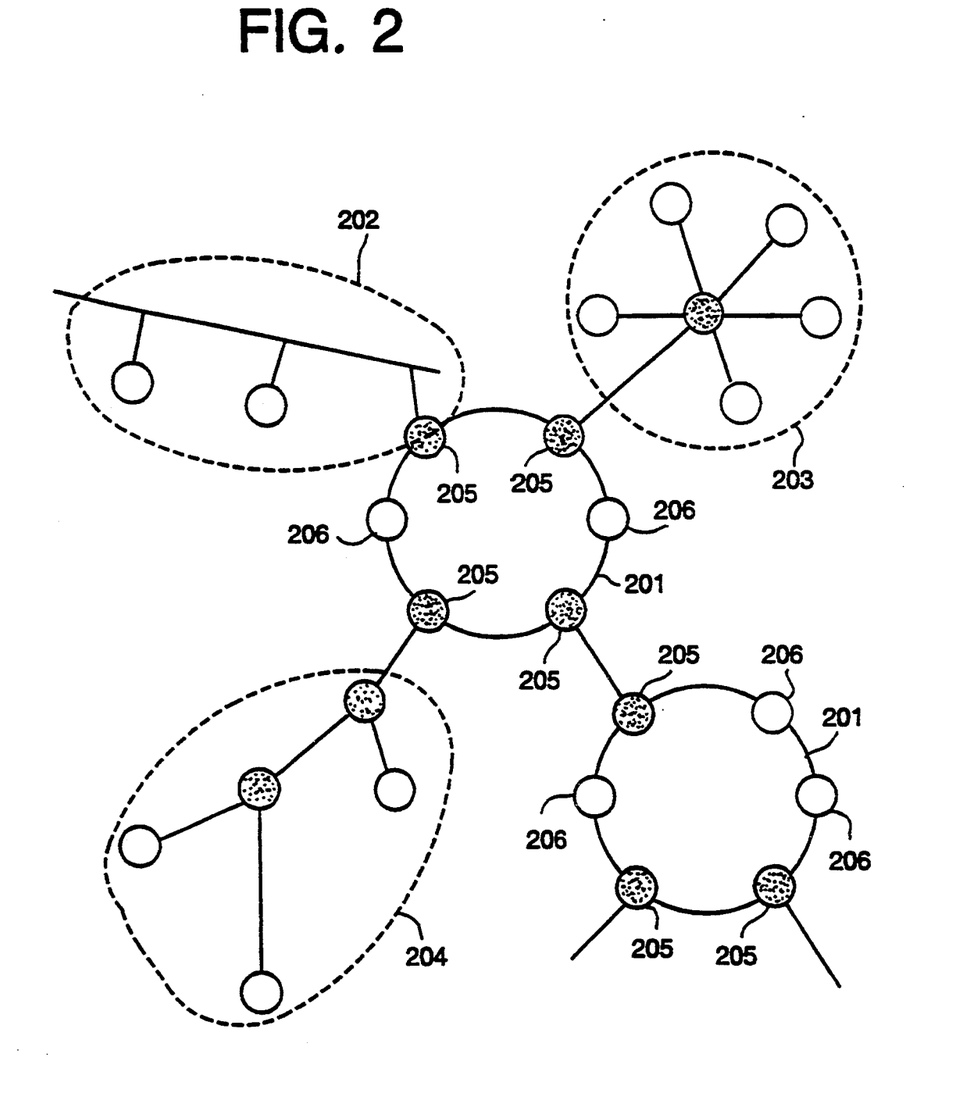
FIG. 2 is a network diagram of the composite communication network of FIG. 1.

FIG. 1 shows the construction of a first and a second embodiment of a composite communication network of the present invention, and FIG. 2 shows an example of a network of the embodiment of FIG. 1.

A composite communication network of the first embodiment of the present invention is constructed with a hierarchical structure including a subnetwork at least in part thereof, and within its communication network a message set up in a packet and having a destination node indicated therein is transmitted. Further, a GW node having connection routes extending in the communication network in three or more than three directions has, as shown in FIG. 1, an internal application section 103 and a network layer packet routing protocol section 101.

The internal application section 103 has a routing message table 113 including a first routing table regarding a node belonging to a layer other than the layer to which the GW node belongs, and the network layer packet routing protocol section 101 comprises a network layer packet routing application section 104 including a first transmission control means which refers to the first routing table and a destination node indicated in the packet for transmitting the packet in accordance with an interlayer transmission protocol.

Further, in the GW node and the node other than the GW node in the communication network, the internal application section 103 and the network layer packet routing protocol section 101 are also arranged, where the internal application section 103 has a routing message table 113 which includes a second routing table regarding a node of the layer to which the node belongs. The network layer packet routing application section 104 has a second transmission control means which refers to the second routing table and a destination node indicated in the packet for transmitting the packet in accordance with an intralayer transmission protocol.

With reference to the subnetwork, a subnetwork of ring type, star type, bus type, or a combination of these three types is used as the case demands.

Further, the first transmission control means and the second transmission control means comprise means for determining whether the destination node indicated in the packet is the same as its own node, and means for introducing a message of the packet and preventing transmission of the packet when it is determined by the determining means that the destination node is the same as its own node.

The operation of the first embodiment of the present invention thus constructed will next be described with reference to the drawings.

A packet (hereinafter referred to as network packet 1) inputted from Ethernet 106 passes through an interface circuit (hereinafter referred to as INF) 105 to be connected to the network layer packet routing application section 104 in the network layer packet routing protocol section 101. Upon receiving the network packet 1, the network layer packet routing application section 104 transmits the packet to a message processor 112 in the internal application section 103 through INF 107 and an internal bus 114 when a target GW node of the packet is destined for its own node.

When the target GW node is destined for another node, the network layer packet routing application section 104 classifies the packet as a network packet 2, extracts a next destination GW node by using an internal network layer routing table, and transmits the packet through INF 110 to a data link layer packet routing application section 109 which corresponds to the direction of the next destination GW node. Upon receiving the packet, the data link layer packet routing application section 109 transmits it out to a line (control message communication medium) 111 connected thereto.

It is determined at the data link layer packet routing application section 109 whether the control packet inputted from the control message communication medium 111 into the data link layer packet routing protocol section 102 is destined for its own node or not. When the packet is a network packet 2 destined for its own node, the packet is transmitted to the network layer packet routing application section 104 through INFs 110 and 107. Upon receiving the packet, the network layer packet routing application section 104 executes the routing operation of the network layer level in the same manner as the processing of the above network packet 1. When the received packet is a ring packet destined for its own node, it is transmitted to the message processor 112. If the packet is not destined for its own node, it is transmitted to the data link layer packet routing application section 109 on the other side through INF 110 and the internal bus 114 to be sent out.

Upon receiving the network packet 1 from the network layer packet routing application section 104, the message processor 112 judges whether it is destined for its own node or not. When the network packet 1 is destined for its own node, the message processor 112 processes the message, but when it is not destined for its own node, the message processor 112 converts it to a ring packet and transmits it to the data link layer packet routing application section 109 in the direction given on the routing message table 113 relative to the target node of the packet. The message processor 112 then sets in the packet an intra-ring-network identifier (NE#) of the target node. When the message processor 112 receives the ring packet from the data link layer packet routing application section 109, the processor processes the message internally.

The routing message table 113 is in this example provided in the internal application section 103 as shown in FIG. 1, but may also be provided in parallel in the network layer packet routing protocol section 101 or the data link layer packet routing protocol section 102.

The network in the first embodiment of the present invention is a composite network in which, as shown in FIG. 2, a bus type subnetwork 202, a star type subnetwork 203 and a tree type subnetwork 204 are connected to a ring subnetwork 201. A GW node 205 of the ring subnetwork 201 shown in this network example is constructed as described above and shown in FIG. 1. On a node 206 other than the GW node 205, at least the data link layer packet routing protocol section 102 and the internal application section 103 shown in FIG. 1 are mounted.

Figure 3:
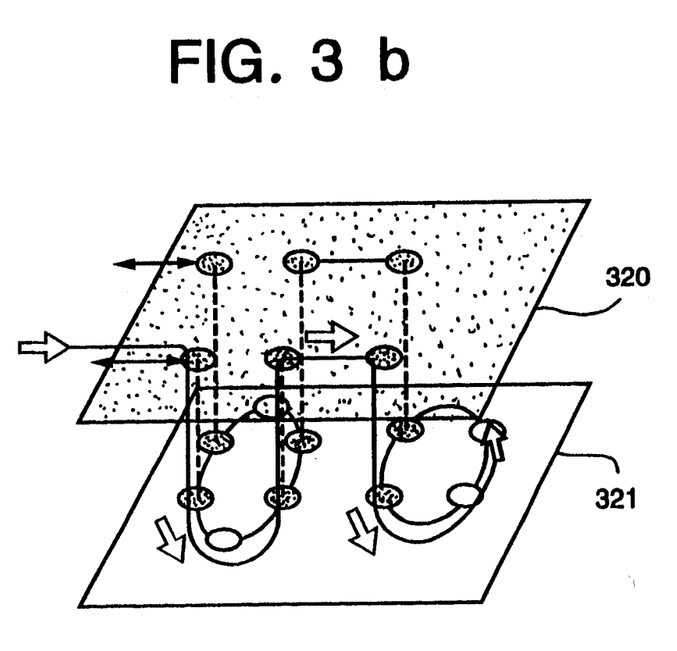
FIGS. 3(a) and 3(b) are views illustrating the basic operation of the composite communication network of FIG. 1.

Here, the summary of the routing method of the first embodiment of the present invention will be described with reference to FIGS. 3a and 3b. FIG. 3a illustrates an example of interlocked rings in which a ring subnetwork 301 and a ring subnetwork 302 are connected with each other. Each of nodes 303 to 307 and 312 having a control message communication medium including three or more than three routes is shown as a GW node and marked with a black circle.

FIG. 3b is a view showing an image of a hierarchical type routing. GW nodes 303 to 307 and 312 carry out the routing between GW nodes according to a protocol 320 of the network layer level. On the other hand, GW nodes and other nodes 308, 309, 310 and 313 carry out the routing within the ring subnetwork in accordance with a routing protocol 321 of the data link layer level. A routing operation 311 which extends from a higher grade operations system (OS) to and including the node 310 shown in FIG. 3a is the routing operation according to a hierarchical routing method shown in FIG. 3b.

Figure 4A:
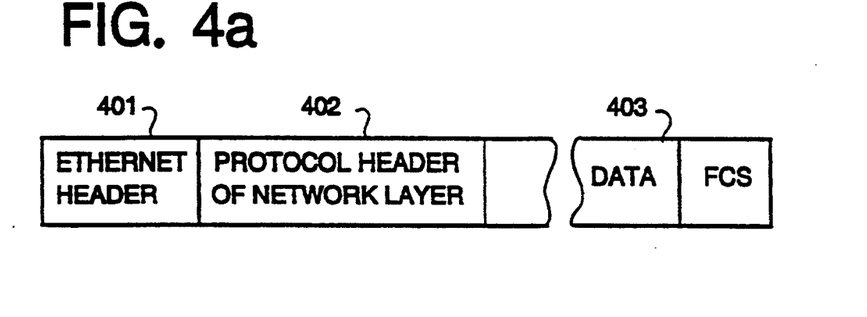
FIGS. 4(a) and 4(b) are views showing the construction of the packet format of the first embodiment of the present invention.

Next, the three kinds of packets described with reference to FIG. 1 will be explained together with the routing algorithm of the network layer packet routing application section 104, the message processor 112, and the data link layer packet routing application section 109 shown in FIG. 1. FIG. 4a is a view showing the construction of a form at at of the network packet 1. The network packet 1 is transmitted between GW nodes by means of the control message communication medium outside the ring subnetwork. Assuming that the communication medium is Ethernet, the format of the packet 1 is constituted by an Ethernet header 401, a protocol header 402 of the network layer, and a DATA section 403.

Figure 4B:
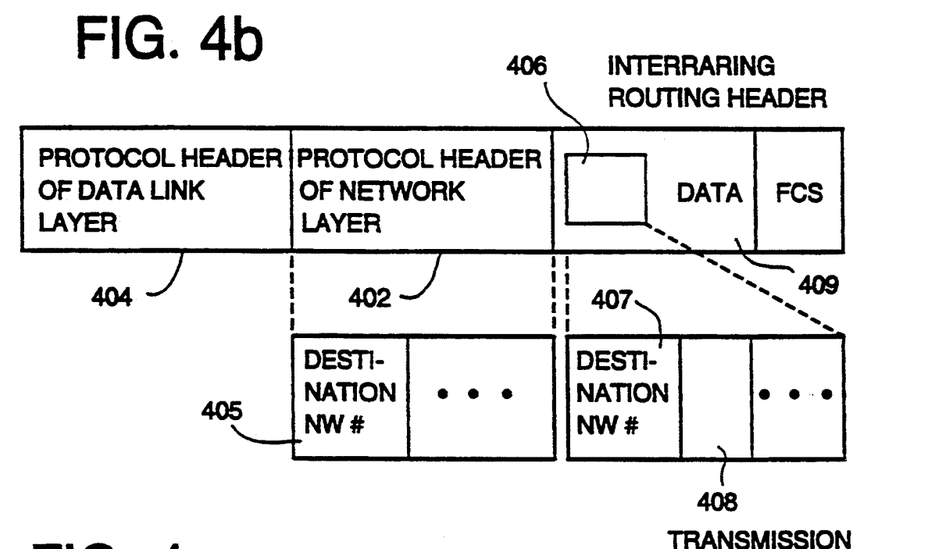

FIG. 4b is a view showing the structure of a format of the network packet 2. The routing operation of the network packet 2 is executed with reference to the network layer in the same way as the network packet 1, but its routing area is limited to a range within the ring subnetwork. The format of the network packet 2 is constituted by a data link layer protocol header 404, the network layer protocol header 402, and a DATA section 409, and in the network layer protocol header 402, a network address (hereinafter referred to as NW address or NW#) 405 of a target GW node to be used for routing of the network layer is established.

Figure 8:
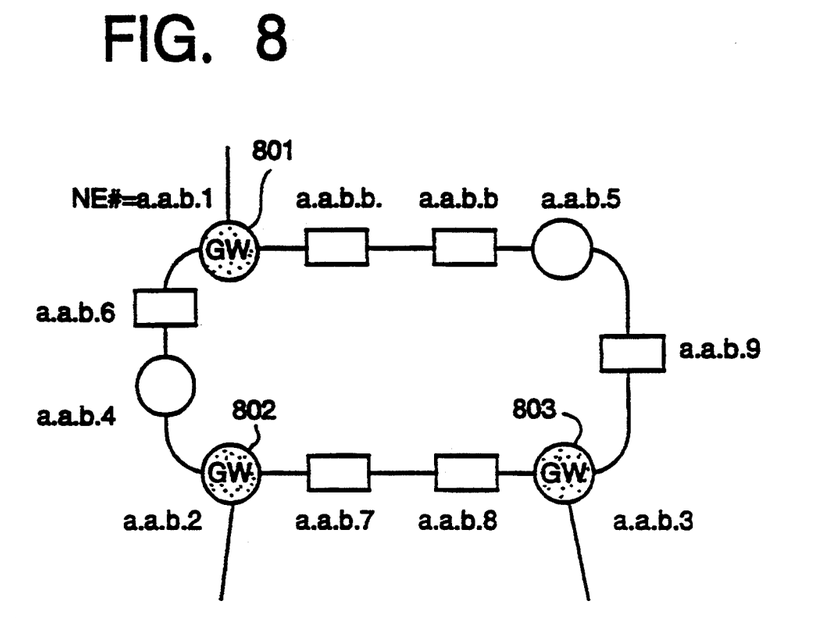
FIG. 8 is a view showing an example of a network address, that is, an NE address to be defined for a node which is included in the ring network of the first and second embodiments of the present invention.

Further, the DATA section 409 has an intra-ring routing header 406 in which a destination network element address (hereinafter referred to as NE address or NE#) 407 to be used in the intra-ring routing operation is established. The NW# is an address to be used for determining a GW node in the network and the NE# is an address to be used for determining each ring node in the ring subnetwork. FIG. 8 is a view showing an example of the ring subnetwork with the addresses NE#s given thereto, wherein each GW node is given with addresses NW# and NE#.

Figure 4C:
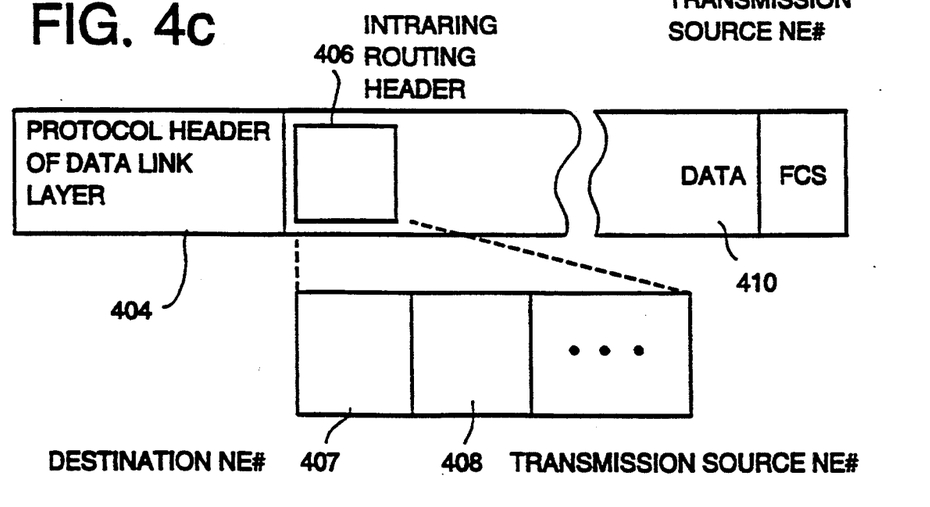
FIG. 4(c) is a view showing the construction of the packet format of the second embodiment of the present invention.

FIG. 4c is a view showing a format of a ring packet in which routing is established in the data link layer in the ring subnetwork. A DATA section 410 has an intraring routing header 406 in the same way as the network packet 2.

Figure 5:
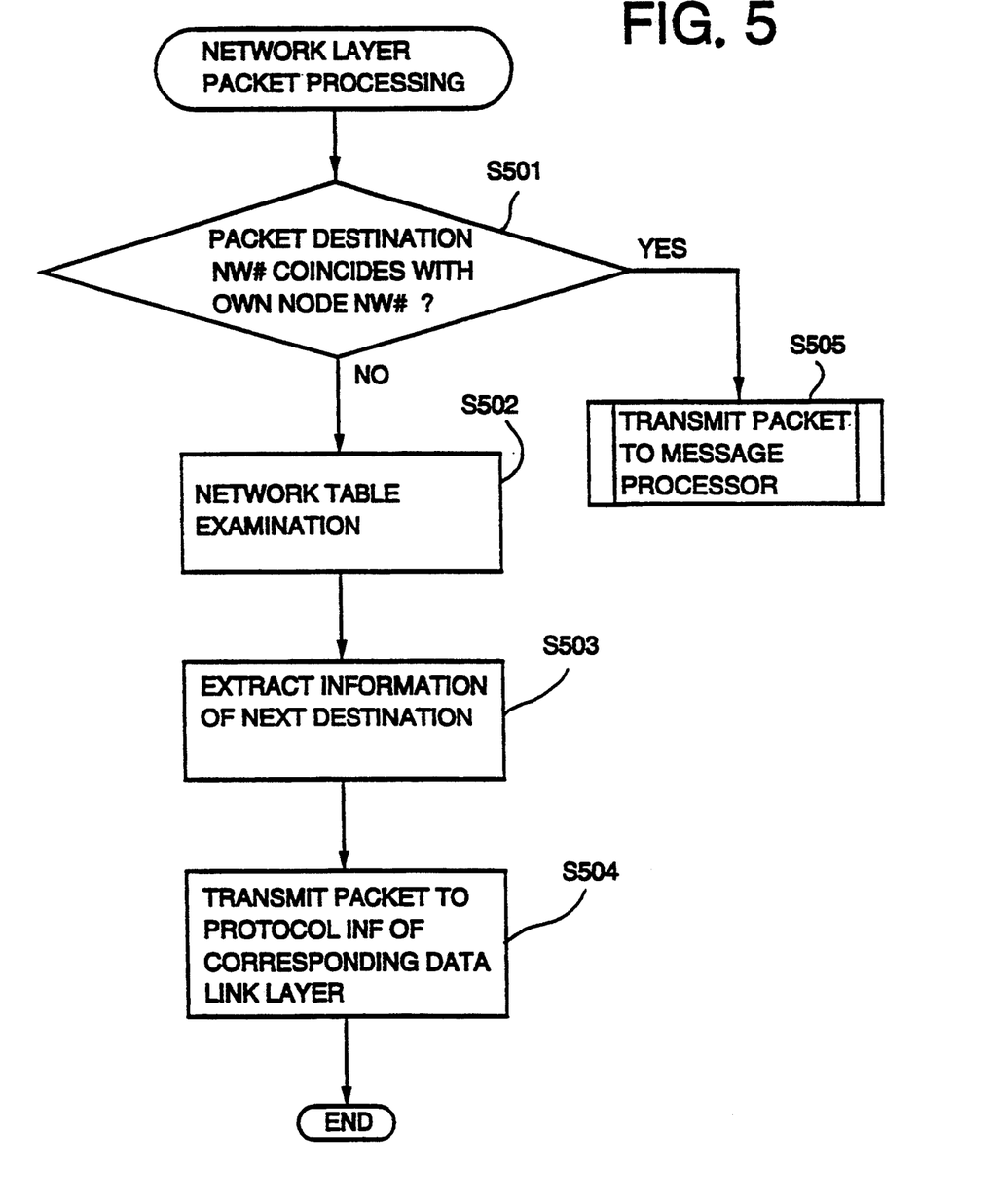
FIG. 5 is a flow chart showing a processing route of a network layer packet routing application section 104 of FIG. 1.

FIG. 5 is a flow chart showing a packet processing route of the network layer packet routing application section 104 of the first embodiment of the present invention. Upon receiving the network packet 1 or the network packet 2, the network layer packet routing application section 104 performs mapping of NW# of the target node of the packet and NW# of its own node (S501), and when they coincide with each other, the network layer packet routing application section 104 decides that the received packet is destined for its own node and performs processing to transmit the packet to the message processor 112 (S505). When the NW#s do not coincide, the network layer packet routing application section 104 refers to the included routing table (network table) (S502) to extract a message related with the next destination GW node (S503). Then, in order to transmit the packet to the above GW node, the network layer packet routing application section 104 transmits the packet to the corresponding data link layer packet routing protocol section 102 (S504).

Figure 6:
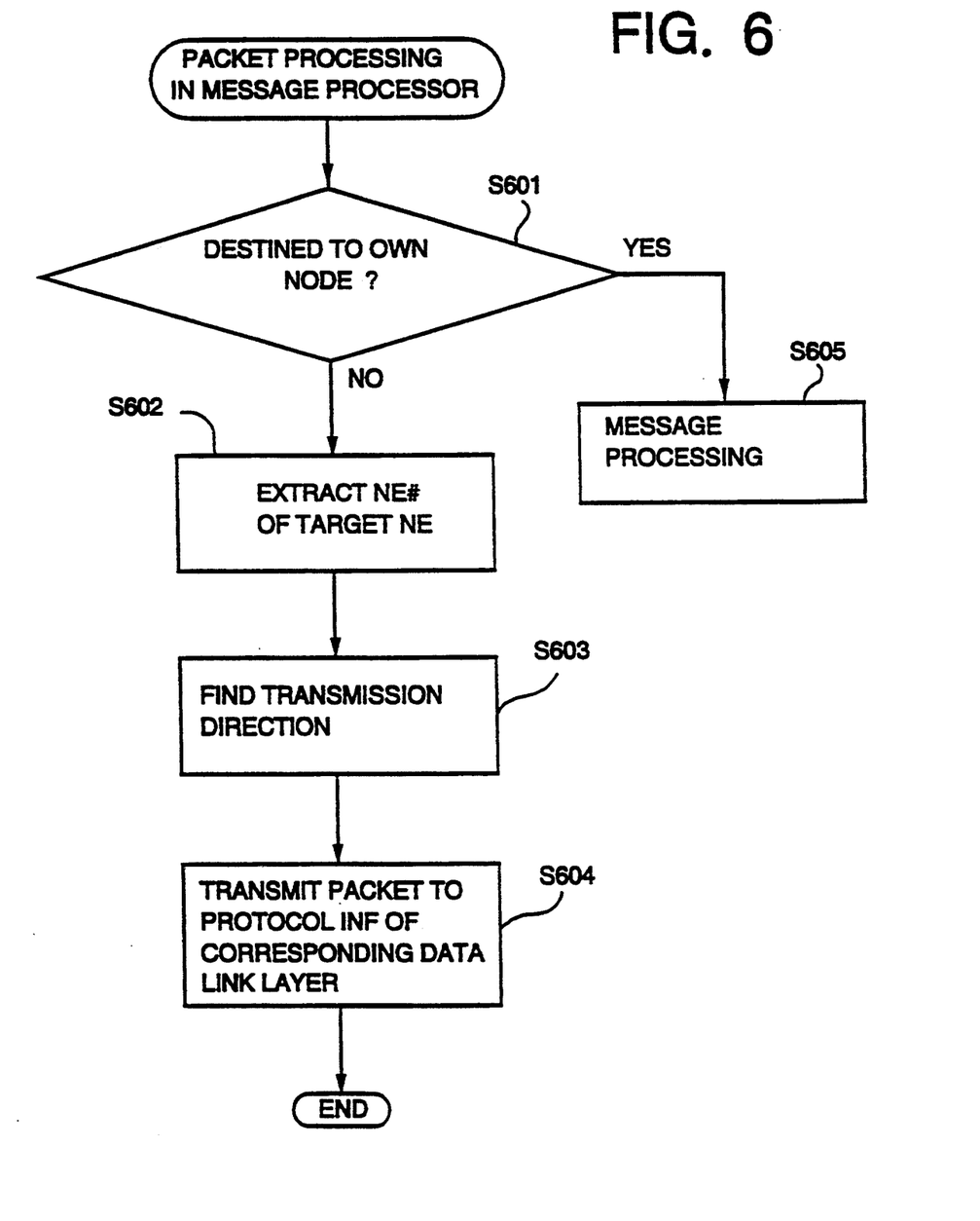
FIG. 6 is a flow chart showing a packet processing route of a message processor 112 of FIG. 1.

FIG. 6 is a flow chart showing a packet processing route of the message processor of the first embodiment of the present invention. Upon receiving the packet, the message processor 112 judges whether its own node is the target node of the packet or not (S601). When its own node is the target node of the packet, that is, the packet is destined for its own node, the message processor 112 processes the message (S605). However, when not destined for its own node, the message processor 112 searches NE# of the target node (S602) and further finds a direction of transmission toward the target node (S603), and then transmits the ring packet to INF 110 of the data link layer packet routing protocol section 102 corresponding to the above transmission direction (S604).

Figure 7:
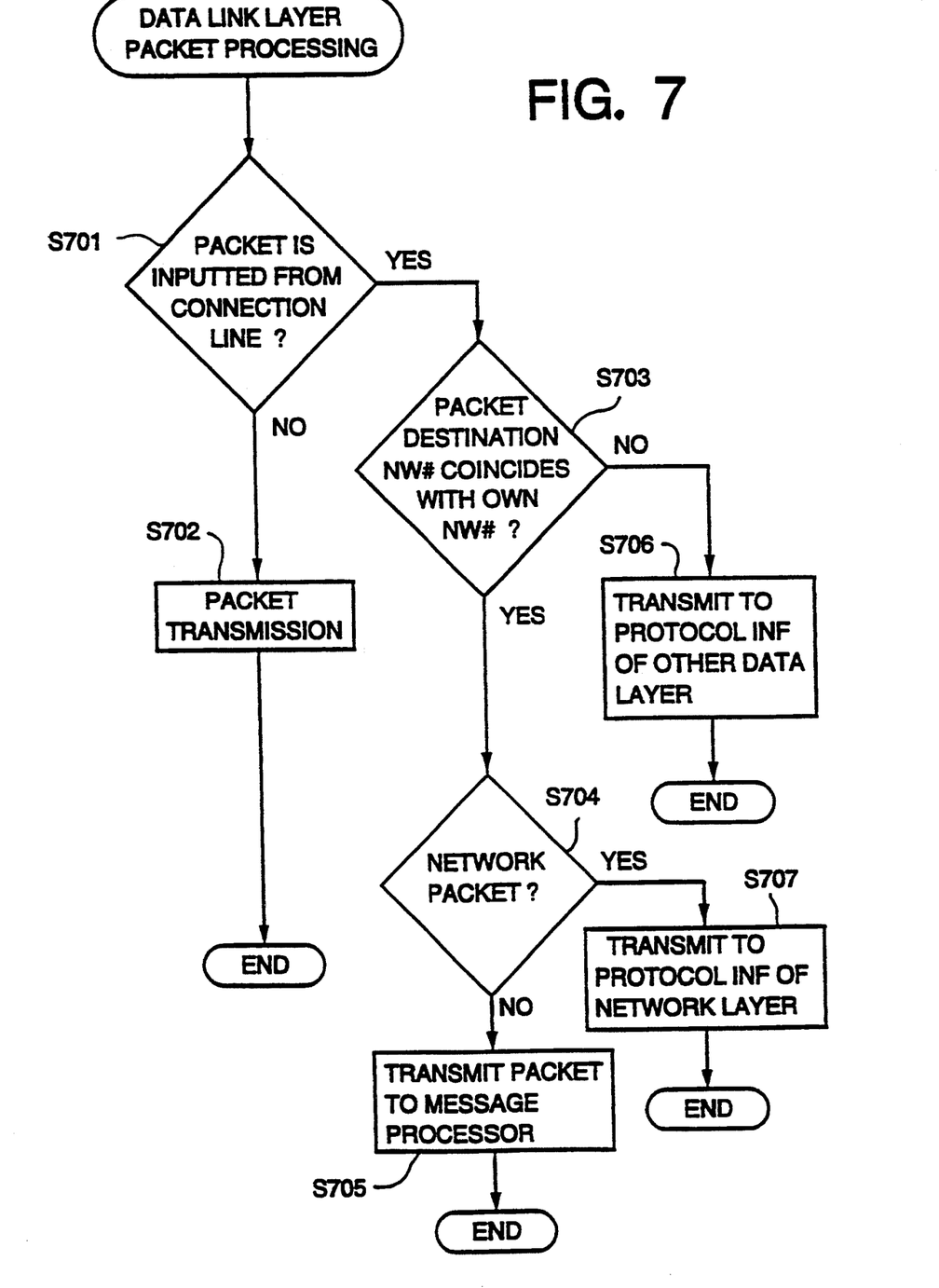
FIG. 7 is a flow chart showing a packet processing route of the data link layer packet routing application section 109 of FIG. 1.

FIG. 7 is a flow chart showing a packet processing route of the data link layer packet routing application section of the first embodiment of the present invention. Upon receiving the packet, the data link layer packet routing application section 109 judges whether the packet is transmitted from the internal bus 114 or received from the control message communication medium 111 in the connection line (S701). When the packet is transmitted from the internal bus 114, the packet is processed for transmitting to the connected line 111 (S702). If the packet is not transmitted from the internal bus 114, the data link layer packet routing application section 109 performs mapping of the destination node NE# of the packet and NE# of its own node (703). When they do not match with each other, the data link layer packet routing application section 109 decides that the packet is not destined for its own node and simply processes the packet to transmit it to another data link layer packet routing protocol section (S706). By processing packets in this way, the simple relaying operation within a ring type subnetwork is carried out without receiving any assistance from the higher-order layer, and hence, the relay processing speed can be increased. On the other hand, if both NE#s match with each other, the data link layer packet routing application section 109 checks whether it is a network packet 2 (S704) and transmits the packet to the protocol section of the network layer when the packet is the network packet 2 (S707), and, when the packet is a ring packet, it transmits the packet to the message processor 112 (S705).

Figure 9A:
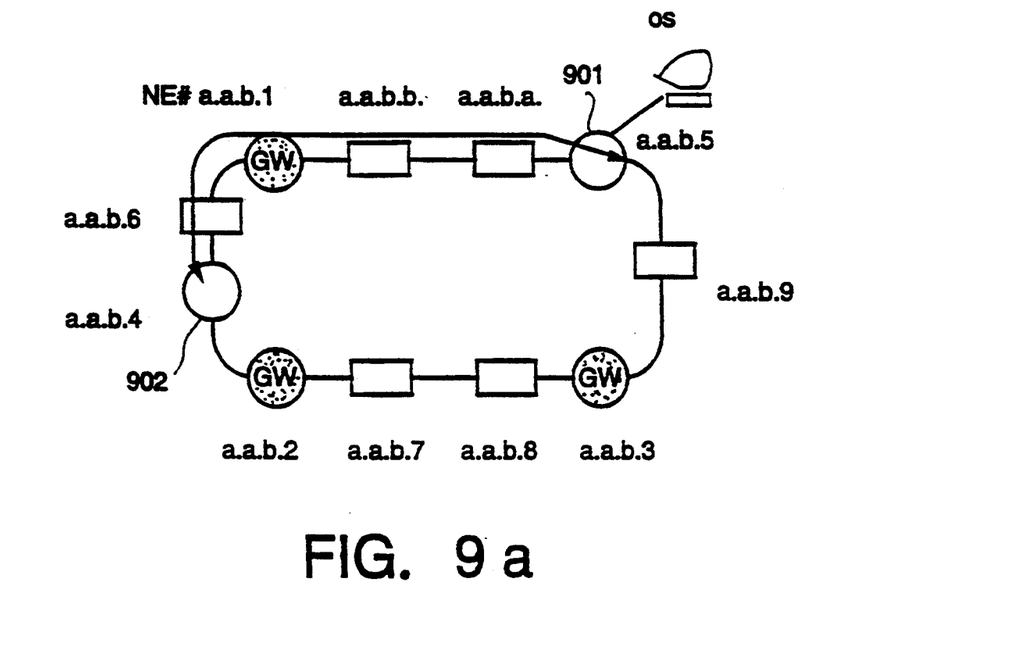
FIGS. 9(a) and 9(b) are views illustrating the routing operation of the control message in the ring subnetwork of the first and second embodiments, respectively, of the present invention.
Figure 9B:
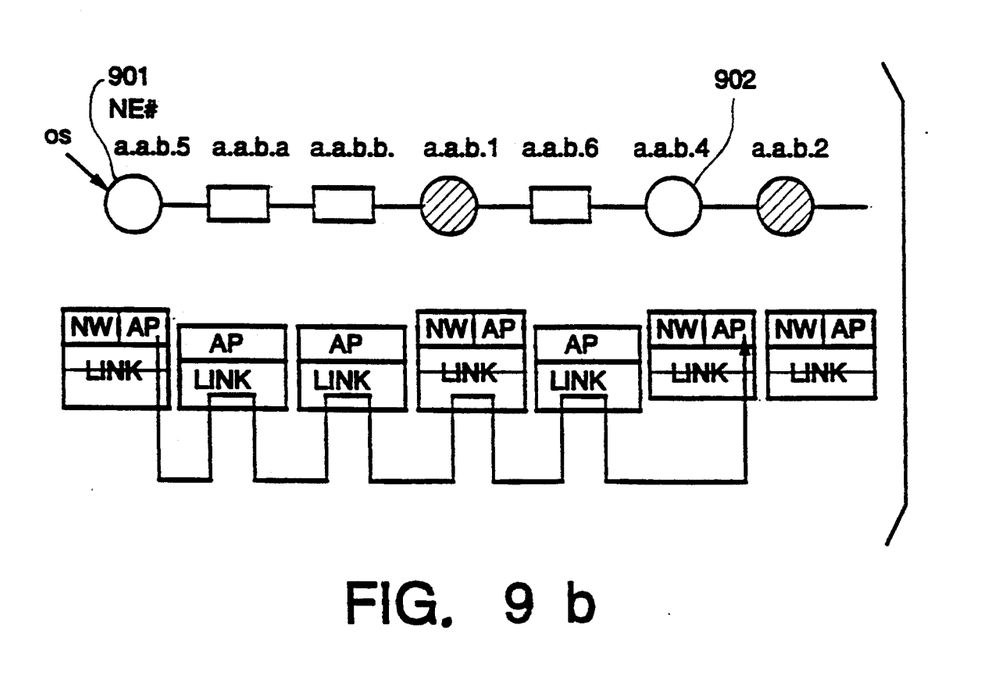

FIG. 9a and FIG. 9b are diagrammatic views illustrating the routing operation of the control message executed within the ring subnetwork of the first embodiment of the present invention. FIG. 9b illustrates the details of routing applied to the network of FIG. 9a from node 901 to node 902, that is, routing is applied to nodes from the transmission source node 901 to the target node 902 with reference to the data link layer.

Figure 10A:
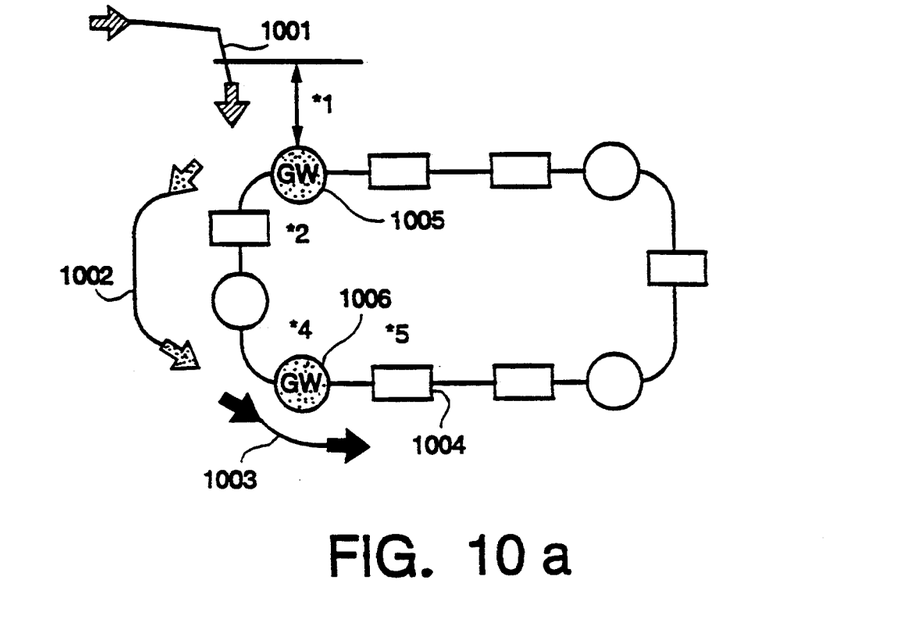
FIGS. 10(a) and 10(b) are views illustrating the routing operation when routing is performed from outside the ring subnetwork to and including a target node with reference to the first and second embodiments, respectively, of the present invention.
Figure 10B:
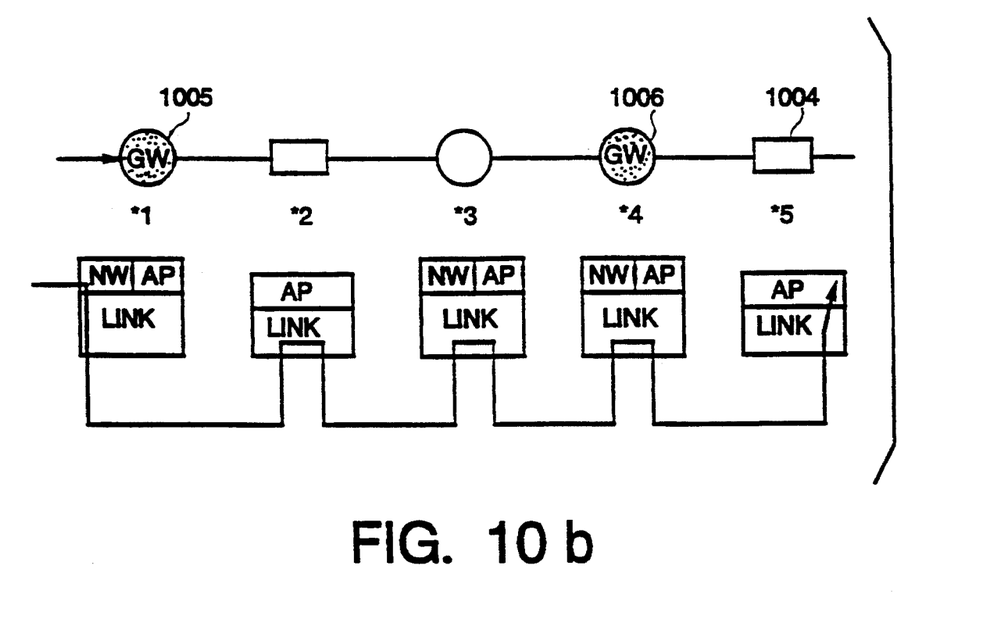

FIG. 10a and FIG. 10b are diagrammatic views illustrating the routing operation applied to the control packet of the first embodiment of the present invention from outside the ring subnetwork to the target node in the ring.

A network packet 1 (1001) including a control message is transmitted from the transmission source to a GW node 1005 of the ring subnetwork. The network packet 1 is then converted to a network packet 2 (1002) at the GW node 1005 and a routing operation is applied to the data link layer from here to a GW node 1006. The routing operation of the network layer is terminated at the GW node 1006 and the packet is converted there to a ring packet 1003 and the routing operation of the data link level is then carried out from the GW node 1006 to a target node 1004.

A second embodiment of the present invention includes a first transmission control means and/or a second transmission control means which correspond to those of the first embodiment and further comprises: means for determining whether a packet is for a health check; means for introducing a message of said packet while executing a health check of its own node when a packet for the health check is found by the determining means; means for sending a trouble signal to a plurality of nodes when abnormality is detected in the result of the health check; and further, the first transmission control means and the second transmission control means comprise means for updating the first routing table and/or the second routing table according to a message when a message (trouble message) for change of routing is included in the message. Regarding matters other than those described above, all means and procedures are constructed in the same way as in the first embodiment.

The present second embodiment will be described with reference to a case in which there are routing protocols of two levels, and in which the level 2 (hereinafter referred to as L2) routing protocol is mounted on the network layer and the level 1 (hereinafter referred to as L1) routing protocol is mounted on the data link layer.

Therefore, in the following description, the L2 routing protocol will be referred to as a network layer packet routing protocol, and the L1 routing protocol will be referred to as a data link layer packet routing protocol.

In FIG. 1, a control packet (L2 packet) inputted from Ethernet 106 passes through INF 105 and is connected to a network layer packet routing application section 104 in a network layer packet routing protocol section 101. When the network layer packet routing application section 104 receives the L2 packet and finds that the target GW node of the packet is the same as its own node, the network layer packet routing application section 104 transmits the packet to a message processor 112 in an internal application section 103 through INF 107 and an internal bus 114. When the target GW node of the packet is not the same as its own node, the packet will be transmitted to a data link layer packet routing application section 109 which corresponds to the direction of a next GW node. Upon receiving the packet, the data link layer packet routing application section 109 sends the packet out to a connection line (control message communication medium) 111.

The control packet inputted from the line (control message communication medium) 111 to a data link layer packet routing protocol section 102 is judged at the data link layer packet routing application section 109 to determine whether the packet is an L2 packet or not. When the packet is an L2 packet, the data link layer packet routing application section 109 transmits the packet to another data link layer packet routing application section 109 through INF 110 and the internal bus 114 if its own node is not the GW node, and transmits the packet to the network layer packet routing application section 104 through INFs 110 and 107 if its own node is the GW node. Upon receiving the packet, the network layer packet routing application section 104 carries out the routing operation of the network layer level in the same manner as the processing of the above L2 packet. If a packet is an L1 packet and destined for its own node, it is transmitted to the message processor 112. On the other hand, if the packet is not destined for its own node, the packet is transmitted to another data link layer packet routing application section 109 through INF 110 and the internal bus 114 to be sent out to the line 111.

Upon receiving an L2 packet from the network layer packet routing application section 104, the message processor 112 judges whether it is destined for its own node or not. The message processor 112 processes the message if the packet is destined for its own node, and if not destined thereto, converts the L2 packet to an L1 packet and transmits it to the data link layer packet routing application section 109 in the direction indicated in a routing message table 113 relative to the target node of the packet. At this time, an intra-ring-network identifier (NE#) of the target node is set in the packet. Further, when the message processor 112 receives a ring packet from the data link layer packet routing application section 109, it processes the message inside the processor.

The routing message table 113 shown in FIG. 1 can be placed not only in the internal application section 103, but also in the network layer packet routing protocol section 101 or the data link layer packet routing protocol section 102 being parallel distributed, as in the first embodiment.

A network of the present second embodiment is a composite network in which the bus type subnetwork 202, star type subnetwork 203 and tree type subnetwork 204 are connected to the ring subnetwork 201 as shown in FIG. 2. The GW node 205 of the ring subnetwork 201 illustrated in this network example is constituted as described above and shown in FIG. 1. On a node 206 other than the GW node 205, at least the data link layer packet routing protocol section 102 and the internal application section 103 shown in FIG. 1 are mounted.

Here, the summary of the routing method of the second embodiment of the present invention will be described with reference to FIGS. 3a and 3b. FIG. 3a illustrates an example of Interlocked Rings in which a ring subnetwork 301 and a ring subnetwork 302 are connected with each other and FIG. 3b is a view showing a representation of routing activity of a hierarchical type. The routing method of 10 the present embodiment includes a control message medium which has transmission routes extending in more than three directions in the same way as in the first embodiment. GW nodes 303 to 307 and 312 carry out the routing between GW nodes according to a protocol 320 of the network layer level. On the other hand, the GW nodes and other nodes 308, 309, 310 and 313 carry out the routing within the ring subnetwork in accordance with a routing protocol 321 of the data link layer level.

L1 and L2 packets will next be described with reference to FIG. 1 together with the routing algorithm of the network layer packet routing application section 104, the message processor 112, and the data link layer packet routing application section 109 shown in FIG. 1. An L2 packet is a packet in which routing is applied between GW nodes. Supposing that the communication medium is Ethernet, the format of the packet is constituted by an Ethernet header, a protocol header of a network layer, and a DATA section.

FIG. 4c illustrates a format of an L1 packet in which routing is established in the data link layer in the ring subnetwork. The L1 packet is composed of a protocol header 404 of the data link layer and a DATA section 410. The DATA section 410 has an intra-ring routing header 406 wherein a destination NE# 407 and a transmission source NE# 408 in the intra-ring routing are set up. The NE# is an address to be used in the ring subnetwork for determining each ring node. In the case of the GW node, it has NW# as an identifier to be monistically defined in the network in addition to NE#. FIG. 8 illustrates an example of the ring subnetwork to which NE# is given as described above.

FIG. 5 is a flow chart showing a packet processing route of the network layer packet routing application section of the second embodiment of the present invention. The packet processing operation is such that, upon receiving an L2 packet, the network layer packet routing application section 104 performs mapping of NW# of the target node of the packet and NW# of its own node (S501), and when they are coincident with each other, the network layer packet routing application section 104 decides that the received packet is destined for its own node and performs processing to transmit the packet to the message processor 112 (S505). When the two NW#s do not coincide, the network layer packet routing application section 104 refers to the routing table (network table) included therein (S502) to extract a message with reference to the next destination GW node (S503). Then, in order to transmit the packet to the above GW node, the network layer packet routing application section transmits the packet to the corresponding data link layer packet routing protocol section 102 (S504).

FIG. 6 is a flow chart showing a packet processing route of the message processor of the second embodiment of the present invention. Upon receiving the packet, the message processor 112 judges whether its own node is the target node of the packet or not (S601). When its own node is the target node of the packet, that is, when the target node is destined for its own node, the message processor 112 processes the message (S605). However, when the packet not destined for its own node, the message processor 112 searches NE# of the target node (S602), finds a direction of transmission toward the target node (S603), and then transmits the ring packet to INF 110 of the corresponding data link layer packet routing protocol section 102 (S604).

Figure 11:
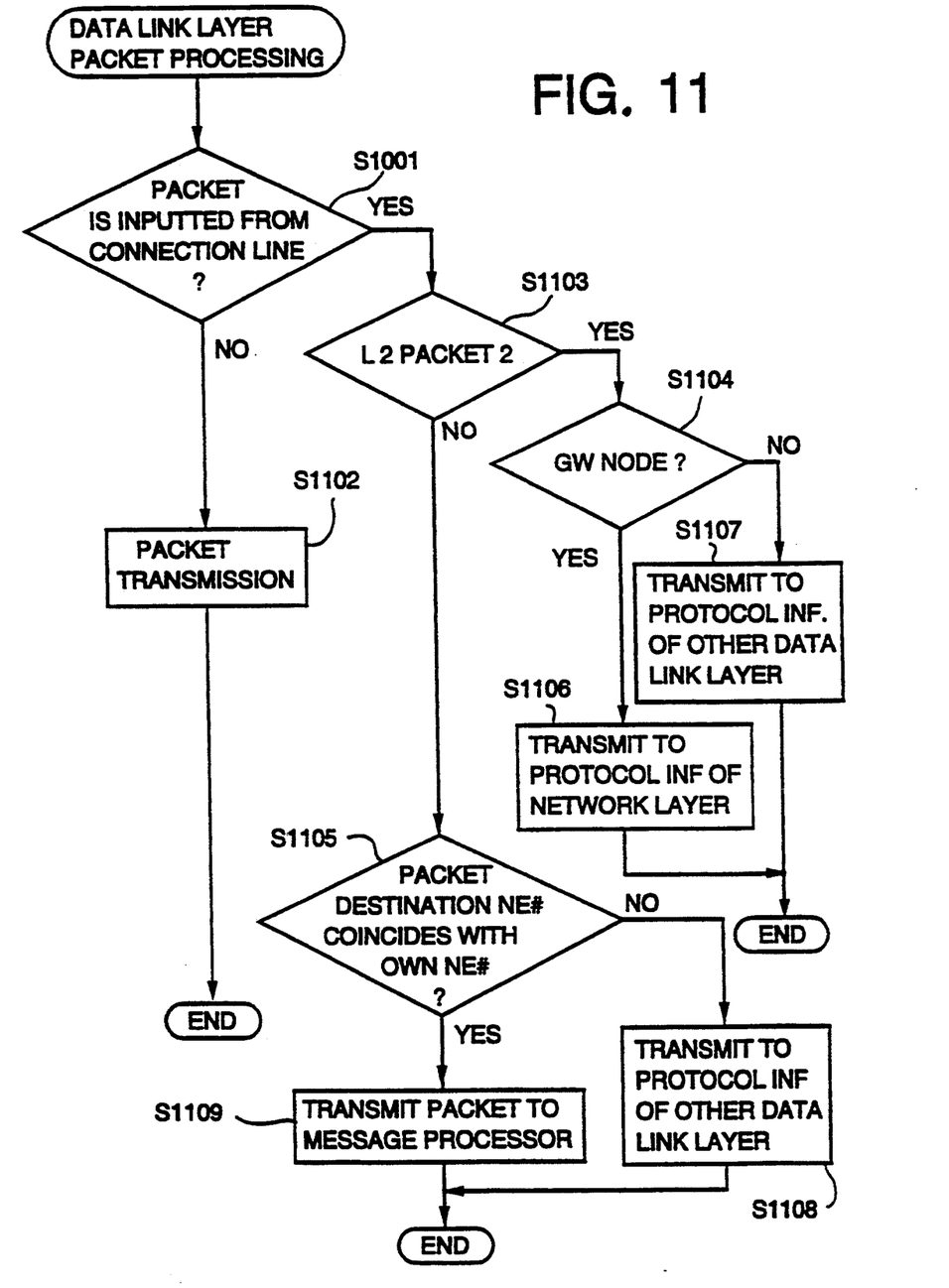
FIG. 11 is a flow chart showing a packet processing route of the data link layer packet routing application section of FIG. 1 of the second embodiment of the present invention.

FIG. 11 is a flow chart showing a packet processing route of the data link layer packet routing application section of the second embodiment of the present invention. Upon receiving the packet, the data link layer packet routing application section 109 judges whether the packet is transmitted from the internal bus 114 or received from the control message communication medium in the connection line 111 (S1101). When the packet is transmitted from the internal bus 114, the packet is processed and transmitted to the connection line 111 (S1102). If the packet is not transmitted from the internal bus 114, the data link layer packet routing application section 109 distinguishes whether or not it is an L1 packet or L2 packet (S1103). If it is an L2 packet, the data link layer packet routing application section 109 judges whether or not its own node is the GW node (1104), and if the judgment indicates that its own node is the GW node, transmits the packet to the protocol INF of the network layer (S1106). If the judgment indicates that its own node is not GW node, it processes and transmits the packet to the protocol INF of another data link layer (S1107). On the other hand, when the packet is judged to be an L1 packet, the data link layer packet routing application section 109 performs mapping of the destination node NE# of the packet and NE# of its own node (S1105). When they do not match with each other, the data link layer packet routing application section 109 judges that the packet is not destined for its own node and simply processes the packet to transmit it to other data link layer packet routing protocol section (S1108). By processing packets in this way, the simple relaying operation within a ring type subnetwork is carried out without receiving any assistance from the higher-order layer, and hence, the relay processing speed can be increased. If both NE#s match with each other, the data link layer packet routing application section 109 transmits the packet to the message processor 112 (S1109).

FIG. 9a and FIG. 9b are diagrammatic views illustrating the control message routing operation within the ring subnetwork of the first embodiment of the present invention. As shown in FIG. 9b, routing of the data link layer is performed between and including the transmission source node 901 and the target node 902.

FIG. 10a and FIG. 10b are diagrammatic views illustrating the routing operation with reference to the control packet of the second embodiment of the present invention executed in the range outside the ring subnetwork to a target node in the ring. FIG. 10b illustrates the details of the routing operation executed between and including GW node 1005 and node 1004 of FIG. 10a. An L2 packet (1001) including a control message is transmitted from the transmission source to a GW node 1003 of the ring subnetwork, at which point the network layer routing is terminated and the L2 packet is converted to an L1 packet (1002) and routing is performed to a target node 1004 with reference to the data link layer. In FIGS. 9a and 9b and FIGS. 10a and 10b, at each of the intra-ring routing starting nodes 901 and 1005, directions of transmission are determined referring to the routing tables.

Figure 12:
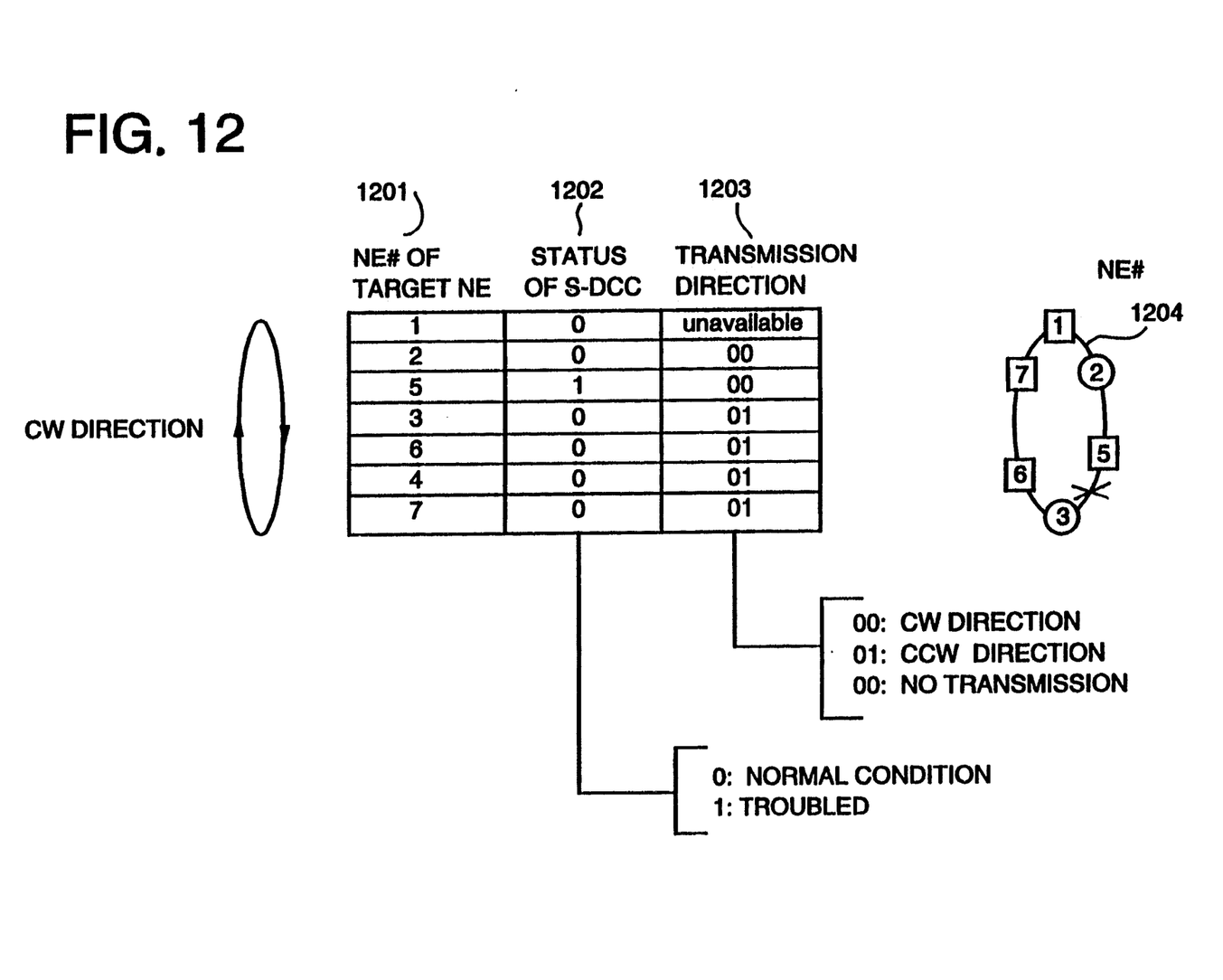
FIG. 12 is a view showing an example of a routing table of the second embodiment of the present invention.

FIG. 12 is a view showing an example of a routing table of the second embodiment of the present invention. This routing table is an example of the routing table to be prepared at node 1 of network 1204 in FIG. 12. In the table, NE# 1201, status 1202 of the control message communication medium and the packet transmission direction 1203 are established in the order of the nodes connected to the ring (CW direction). In the column for status 1202 of the control message communication medium, a condition of the control message communication medium between its own node and a next node is established. In this example, trouble is generated between node 5 and node 3, so that numeral 1 (troubled) is entered on the message column on the right side of node 5. In the column for the transmission direction 1203, the direction of the packet transmission is established for transmitting the packet toward the target node. For example, the CW direction gives the shortest way to transmit the packet from node 1 to node 5, with 00 set in the transmission direction. As for node 3, although the CW direction gives the shortest route for transmitting the packet, the status of the control message communication medium indicates trouble between nodes 3 and 5, with 01 (CCW direction) set therein.

Figure 13:
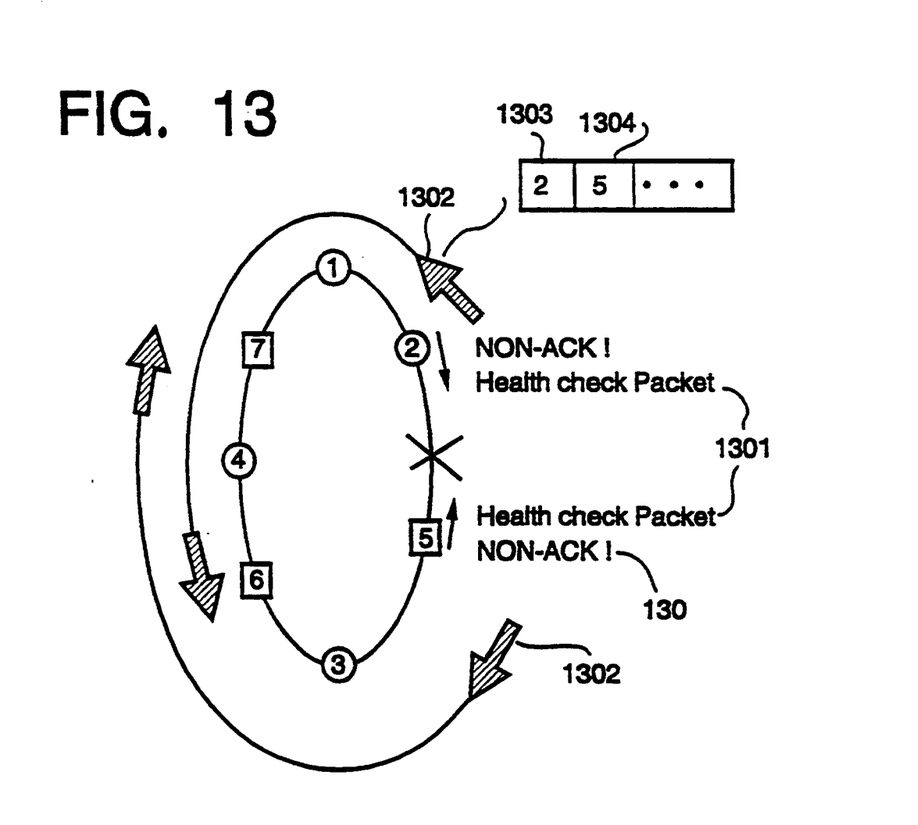
FIG. 13 is a view illustrating a method of updating the routing table in an autonomous distribution mode with reference to the second embodiment of the present invention.

FIG. 13 is a view showing a method of updating a routing table based on an autonomous distribution mode with reference to the second embodiment of the present invention. Each node in the ring network exchanges a health check packet 1301 periodically with neighboring nodes and checks normalcy of the control message communication medium. When an abnormality, such as no reply of the control message communication medium, is detected, an abnormality message 1302 is broadcast along the ring toward the other control message communication medium. In the abnormality message are recorded at least NE# 1303 of a node which detected trouble and NE# 1304 of a node connected to the other end of the troubled communication medium. Upon receiving an abnormality message, each node transmits the message to a next node and at the same time introduces the message into the node to revise the routing table for updating. As described above, in accordance with the present invention, by performing routing of the data link layer level with reference to relay nodes in the ring network, processing speed in the composite communication network can be increased and the number of host nodes to be controlled in the routing of the network layer level can be considerably reduced so as to enable the reduction of the contents of the routing table, thereby further increasing processing speed. Furthermore, due to a routing table updating function provided in the network, reliability of the data link layer level can also be improved.

We claim:

1. A composite communication network of a hierarchial structure formed of a plurality of nodes located in a plurality of layers and including a subnetwork, wherein a message set up in a packet and having a destination node indicated therein is transmitted, said plurality of nodes including a gateway node having connection routes of three or more than three directions extending in said communication network and a non-gateway node having connection routes of two or fewer directions extending in said communication network, said gateway node comprising:

a first routing table regarding a first node which belongs to a layer other than the layer to which said first node belongs; and a first transmission control means which refers to said first routing table and the destination node indicated in said packet for transmitting said packet in accordance with an interlayer transmission protocol; and said gateway node and said non-gateway node each comprising:

a second routing table related with a second node in the layer to which said second node belongs;

a second transmission control means which refers to said second routing table and the destination node indicated in said packet for transmitting said packet in accordance with an intralayer transmission protocol.

2. The composite communication network according to claim 1, wherein said subnetwork has one of a ring structure, a star structure, a bus structure, and a combination of a ring structure, a star structure and a bus structure.

3. The composite communication network according to claim 1, wherein each of said first transmission control means and said second transmission control means comprises:

means for determining whether the destination node indicated in said packet is the same as a current node in which the packet is currently located;

means for receiving said packet into the current node and simultaneously preventing transmission of said packet when the destination node is determined by said determining means to be the same as the current node.

4. The composite communication network according to claim 1, wherein each of said first transmission control means and said second transmission control means includes:

means for determining whether said packet is for a health check;

means for receiving said packet in said current node and concurrently executing the health check of the current node when said packet is found for the health check determining means;

means for sending a trouble message to the plurality of nodes when abnormality is detected in the result of said health check.

5. The composite communication network according to claim 4, wherein each of said first transmission control means and said second transmission control means comprises:

means for updating at least one of said first routing table and said second routing table in accordance with a message for a change of routing when a message for a change of routing is included in said message contained in said packet.

6. The composite communication network according to claim 5, wherein the message for a change of routing is the trouble message.

* * * * *

UNITED STATES PATENT AND TRADEMARK OFFICE
CERTIFICATE OF CORRECTION

PATENT NO. : 5,452,292
DATED : Sept, 19, 1995
INVENTOR(S) : Yasuyo Okanoue, et al.

It is certified that error appears in the above-indentified patent and that said Letters Patent is hereby corrected as shown below:

On the Title page, item [73], add the following: NEC Corporation, Tokyo, Japan--.

Signed and Sealed this

Fourteenth Day of May, 1996

Attest:

BRUCE LEHMAN

Attesting Officer     Commissioner of Patents and Trademarks